United States Patent Office 3,146,675
Patented Sept. 1, 1964

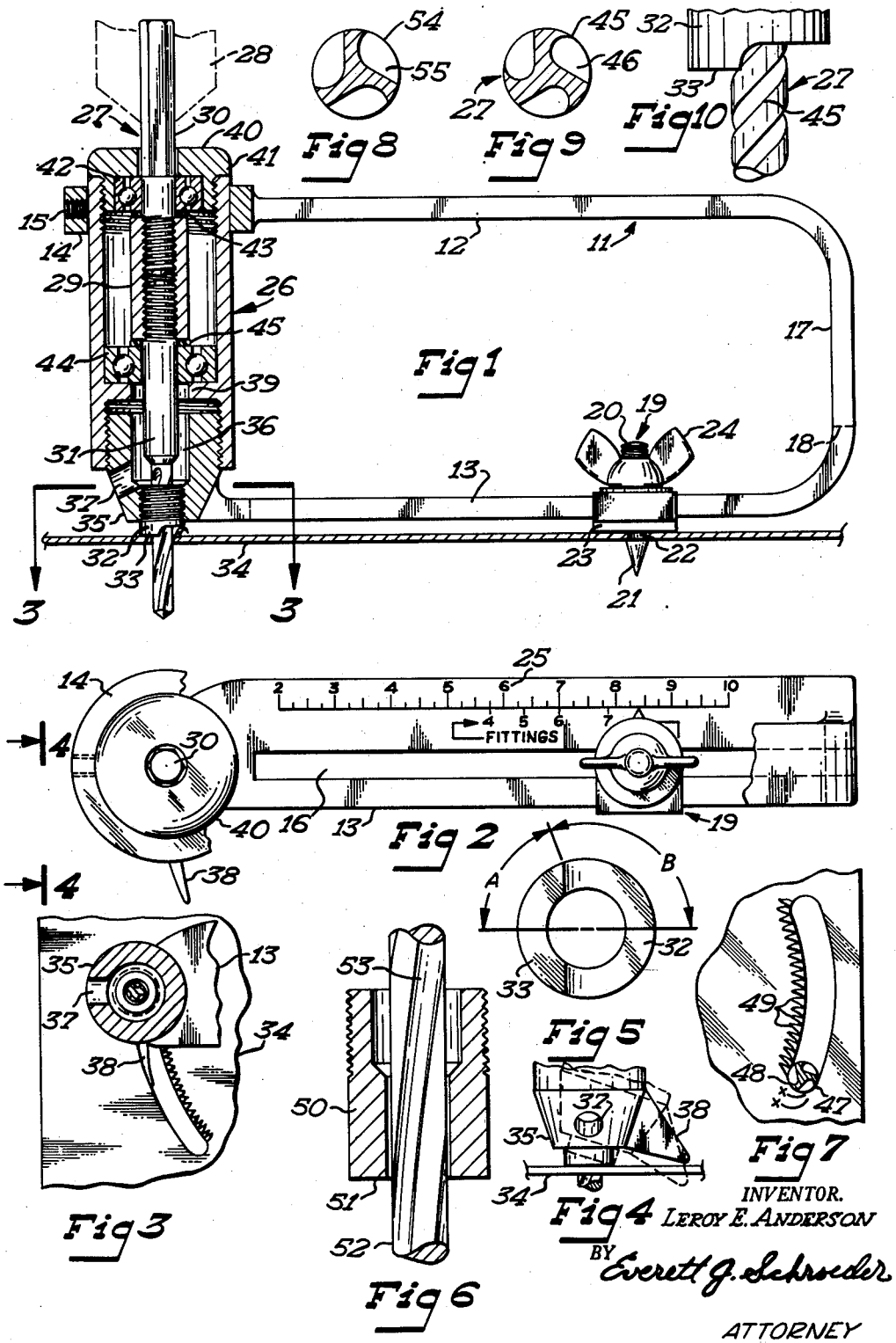

3,146,675
PORTABLE SHEET METAL HOLE CUTTER
Leroy E. Anderson, Detroit Lakes, Minn., assignor to Snappy, Inc., Detroit Lakes, Minn., a corporation of Minnesota
Filed Feb. 13, 1961, Ser. No. 88,775
12 Claims. (Cl. 90—12)

This invention relates to portable milling tools. More particularly, it relates to a portable sheet metal hole cutter for use in cutting a hole or opening in a panel such as a wall of a plenum chamber.

The standard or conventional way of cutting a circuit opening in the wall of a heating plenum chamber today is for the worker to first take a pair of dividers and set them by a rule to the proper radius. A scratch-all is then used to punch a center punch marking and the divider is then applied to such marking to inscribe a circle upon the sheet metal panel. A screw driver or other similar device is then placed against the sheet metal and struck with a hammer to tear a gash in the metal sufficiently large to insert the jaws of a tin snips and the sheet metal is cut with the snips along the arc inscribed by the divider. The cut is made in one direction with a left-hand snips and in the other direction with a right-hand snips, the different snips being required because frequently a joint is in the way if the plenum chamber panel is already in position. Thus a total of seven tools is normally required to cut a circular opening in the wall of a plenum chamber preparatory to attaching a heat conduit fitting thereto. My invention is directed toward the elimination for the requirement of this large number of tools and to substantially reducing the time required for accomplishing this operation. Moreover, my invention is directed toward providing a tool or device which will perform the necessary cutting operation in an improved manner so that the opening will be smooth and truly circular.

It is a general object of my invention to provide a novel and improved portable sheet metal hole cutter of simple and inexpensive construction and operation.

A more specific object is to provide a novel and improved portable sheet metal hole cutter of simple and inexpensive construction capable of performing the desired hole cutting operation in an improved manner and at a great reduction in amount of time required to perform the same.

Another object is to provide a novel and improved portable sheet metal hole cutter which will eliminate the need for a substantial number of tools heretofore conventionally required for cutting a hole in a panel of sheet metal and which will accomplish the cutting action at a great saving of time and effort.

Another object is to provide a novel and improved portable sheet metal hole cutter which will cut a smooth, even, and truly circular opening in a piece of sheet metal with the expenditure of a mere fraction of time and effort as compared to that heretofore required.

Another object is to provide a novel and improved portable sheet metal hole cutter which can be readily adjusted to cut openings of different diameters and can be utilized for forming the other openings required in standard operation such as holes for sheet metal screws, bolts, etc.

Another object is to provide a novel and improved portable sheet metal hole cutter of simple and inexpensive construction which is adaptable for use for simple routing and/or to do pattern cutting of sheet metal and the like.

Another object is to provide a novel and improved portable sheet metal hole cutter in which the drill member may be adjusted so as to utilize all the longitudinal portions thereof to perform the cutting operation.

Another object is to provide a novel and improved portable sheet metal hole cutter in which a combined drill and milling cutter member is utilized in cooperation with a cooperative cutting and abutting surface to greatly facilitate the cutting operation and reduce the time required for the entire operation.

Another object is to provide a novel and improved portable sheet metal hole cutter having adjustable pivot post means which may be utilized to swing the cutting element in a circular path around a predetermined center and which may be swung to an out of way position to permit the cutting element to be used as a router or pattern cutter.

Another object is to provide a novel and improved portable sheet metal hole cutter having stabilizer means associated therewith whereby an accurately circular cut may be accomplished without encountering a lack of stability within the cutting device.

Another object is to provide a novel and improved portable sheet metal hole cutter wherein a cooperative cutting and abutting surface is utilized in combination with a rotary milling cutter having three flutes to greatly increase the speed with which the cutting action may be accomplished.

These and other objects and advantages of this invention will more fully appear from the following description, made in connection with the accompanying drawings, wherein like reference characters refer to the same or similar parts throughout the several views, and in which:

FIG. 1 is a side elevational view of my portable sheet metal hole cutter with the journal structure supporting the rotary drill and milling cutter member being shown in vertical section.

FIG. 2 is a plan view of my portable sheet metal hole cutter with the upper portion of the handle element broken away to more clearly illustrate the same.

FIG. 3 is a horizontal sectional view taken approximately along line 3—3 of FIG. 1.

FIG. 4 is a fragmentary end elevational view taken along approximately line 4—4 of FIG. 2.

FIG. 5 is a bottom elevational view of the preferred form of insert included in the journal structure and carrying the cooperative cutting surface for cooperation with the milling cutter member.

FIG. 6 is a vertical sectional view of a second form of insert which may be carried by the journal structure having a circular cooperative cutting surface designed for forming a smooth and even circular cut.

FIG. 7 is a fragmentary plan view of a sheet of metal with the rotary drill shown in section for the purpose of illustrating the manner in which the increased speed of the cutting action is obtained.

FIG. 8. is a horizontal sectional view of the conventional end milling bit.

FIG. 9 is a horizontal sectional view of my preferred rotary drill member; and

FIG. 10 is a fragmentary front elevational view of the insert shown in FIG. 5 cooperating with a rotary drill member of the type illustrated in FIG. 9.

One embodiment of my invention as shown, includes a generally U-shaped handle member 11 having a pair of vertically spaced legs 12 and 13. At the outer end of the upper leg 12 there is a rigid, open, horizontally extending ring element 14 with a set screw 15 at the forward side thereof. As best shown in FIG. 2, there is an elongated slot 16 formed in the lower leg 13 which extends to the base portion 17 of the handle member 11 upwardly to a distance indicated by the broken line at 18 in FIG. 1.

Mounted within the slot 16 for sliding movement relative thereto longitudinally of the leg 13 is a pivot post indicated generally by the numeral 19. The pivot post 19 includes a shank 20 which is threaded at its upper end and has a pointed conically shaped lower end 21. Immediately above the conically shaped lower end 21 is a reduced portion 22 and immediately thereabove is a radially extending shoulder element 23 adapted to engage the underside of the leg member 13 and to bear thereagainst at opposite sides of the slot 16. A wing nut 24 is threaded upon the outwardly threaded upper end of the shank 20 to secure the pivot post at any desired point along the length of the slot 16. A scale 25 is inscribed opposite the slot 16 with indicia indicating the position at which the pivot post should be located in order to cut a hole adapted to receive variously sized fittings therein.

Mounted upon the outer ends of the leg members 12 and 13 is a journal structure indicated generally by the numeral 26. This journal structure rotatably mounts a rotary combined drill and milling cutter member indicated generally by the numeral 27 which is adapted at its upper end to be connected in driven relation to a source of rotary power as by a chuck 28 of a rotary milling cutter. The drill member 27 includes a shaft 29 which is internally and oppositely threaded at its upper and lower ends to receive the hexagon shaped externally threaded drive element 30 and the externally threaded shank 31 which has a reduced lower end portion bearing the cutting edges of the drill member. The detail of the cutting edges and the lower end portion of the milling cutter member will be hereinafter more specifically described.

The journal structure 26 includes the externally threaded tubular insert 32 through which the drill member 27 extends downwardly. The insert 32 has a cooperative cutting surface 33 at its lower end which extends in close cooperating relationship with the cutting edges of the milling cutter member 27. This insert is preferably made of hardened steel and functions as a journal for the milling cutter member while at the same time providing an abutting surface for a sheet of metal such as that indicated by the numeral 34 and provides a close cooperative cutting action with the cutting edges of the milling cutter member.

The journal structure 26 also includes a nose cone 35 which is welded to the forward end of the lower leg 13 and is externally threaded at its upper end as shown and has a hollow interior 36. A transverse radially extending opening 37 brings the exterior in communication with the hollow interior 36 of the nose cone for a purpose to be hereinafter described. Secured to the lower surface of the nose cone 35 is a stabilizer element 38 which extends radially away from the drill member 27 and depends from the under surface of the nose cone so as to trail in the path of the milling cutter member 27 when a cut is made and the drill member is tilted to the position shown in FIG. 5 in broken lines.

The journal structure 26 also includes the rigid tubular member which is internally threaded at its upper and lower ends and is provided with a radially inwardly extending annular shoulder 39. Threaded into the upper end of the tubular member 38 is a cap member 40 which has a radially outwardly extending flange 41 at its upper end. The cap member 40 serves to hold bearing 42 and seal 43 in place. Bearing 44 and seal 45 are held in place by the ends of the internally threaded shaft 29 in cooperation with the cap member 40 and the annular shoulder 39.

The insert 32 has its lower surface cut-away as best shown in FIG. 1 and FIG. 5 so that the cooperative cutting surface 33 which abuts against the upper surface of the sheet of metal 34 extends only a portion of the distance around the member 27. Consequently with the member turning in a clockwise direction as viewed in FIG. 5 the cooperative cutting action will take place only along the arc indicated therein by the letter A and throughout the arc indicated by the letter B the metal will be rolled inwardly toward the pivot post 19 as shown in FIG. 7. In other words, a clean cutting action will take place along the arc A while a more or less tearing action takes place throughout the arc B, the direction of movement of the milling cutter being upwardly as viewed in FIG. 5. I have found that by utilizing cutting edges 45, which as shown in FIG. 10 extend at approximately 45 degrees to the longitudial axis of the member 27, a lifting action takes place which maintains the sheet 34 of metal abutting against the cooperative cutting surface 33 and greatly facilitates the cutting operation.

The reason for utilizing a cooperative cutting surface which extends only as shown in FIG. 5 is that I have found that by using such a cutting surface rather than a completely circular cutting surface such as is shown in FIG. 6, I can substantially reduce the time required for making a circular cut. For example, I have found that I can make a seven inch diameter circular cut in approximately one-tenth of the time which would be required if a conventional type end milling bit or other drilling bit would be utilized. It will be noted that the drill bit which I utilize, as best shown in FIG. 9 has cutting edges 45 which are defined by flutes 46 having a radius of curvature which is very sharp and approximately one-third the radius of the bit itself. It will also be noted that I utilize a milling cutter bit having only three flutes, the uneven number of flutes being important because, as shown in FIG. 7, when used in cooperation with the cutting surface disposed within the arc A of FIG. 5 the cutting edge indicated by the numeral 47 in FIG. 7 will cut through the major portion of the forward left quadrant of its rotation in cooperation with the cooperative cutting surface 33 but by the time it has reached the position of the cutting surface 48, such cooperative cutting action is no longer available because the cooperative cutting surface is not present. Consequently, the metal engaged by the cutting edge from the time it leaves the cooperative cutting surface within the arc A functions as a pivot since it creates a greater resistance to cutting of the metal of the sheet 34 and hence the next cutting edge which is by now cooperating with the cutting surface 33 will be drawn forwardly at a much more rapid pace.

From this it can be seen that the journalled member 27, when provided with three cutting edges, as shown, in cooperation with a cooperative cutting surface 33, tends to be drawn forwardly to substantially increase the speed at which the cut will be made for a given speed of rotation of the drill bit. The sharp radius of the flute 46 facilitates the tearing action and the curving over of the pieces of metal indicated by the numeral 49 toward the pivot post 19 to further facilitate and increase the speed of the cutting action.

The insert 50 as shown in FIG. 6, has an annular cooperative cutting surface 51 which extends entirely around the bit indicated by the numeral 52. It will be noted that the cutting edges 53 of the bit 52 extend approximately 25 degrees off the longitudinal axis of the bit. The combination of this type of bit and cooperative cutting surface 51 provides a smooth and even cut at both sides of the cut and does not leave the sharp edges along one side of the cut as indicated in FIG. 7. In cutting a hole in a plenum chamber, however, the sharp edges 49 will be carried by the portion which is cut-away and hence their presence is not objectable. From this it can be seen that when a smooth cut is desired a different insert 50 may be substituted for the insert 32 and a different bit may be utilized to perform a smooth cutting action which is not as rapid as that shown in FIG. 7 but is still considerably more rapid than any hole cutting device heretofore known.

FIG. 8 shows a bit 54 of the conventional type in section. It will be noted that the flutes 55 have a substantially greater radius than those shown in FIG. 9. The bit 54 is of the standard type whereas the bit 27 is specially manufactured for my hole cutter.

I have found that through the use of my hole cutter it is a simple matter to cut a desired opening in a piece of sheet metal such as the sheet 34 with a given radius within a matter of 3–5 seconds. This can be accomplished by first using the bit 27 to drill the opening into which the pivot post 19 is to be applied. The pivot post 19 is then snapped into tight fitting position into this opening and a second hole is drilled with the drill bit 27. The handle member 11 is then swung around about the pivot post 19 with the bit 27 quickly and easily, without any appreciable manual effort, to cut a circular opening in the sheet 34 of metal. If the insert 32 is utilized along with the cutting edges which extend approximately 45 degrees to the longitudinal axis of the bit, the cut will appear as shown in FIGS. 3 and 7. Toward the completion of the cut the central portion which is being cut away and which functions as a holder for the pivot post 19 tends to become unstable since the only portion which secures the same to the main sheet 34 is the remaining uncut portion of the sheet. To offset this instability I merely tilt the member 27 and handle 11 so that the stabilizer 39 extends downwardly into the cut in trailing fashion as shown in FIG. 3 and the cutting operation may be continued to completion without any appreciable lack of stability and without varying from a true circular shape. It will be noted that the cutting edges 45 of the member 27 extend upwardly a substantial distance beyond the cooperative cutting surface 33 or 51. In each case shavings will be frequently carried upwardly into the insert and into the hollow interior 36 of the nose cone 35. Such metal shavings will be discharged through the opening 37.

From the above it can be seen that I have provided a simple and novel sheet metal hole cutter which is portable and which can effect a circular cut within a sheet of metal at a substantial saving of time and effort. In doing so I have eliminated the need for seven different tools and considerable time and effort and have at the same time provided a highly improved cut in that the cut will be smooth and truly circular in contrast to that which may be accomplished through the use of tin snips. The use of cutting edges which extend at a greater angle to the longitudinal axis of the bit causes the metal to be lifited against the cooperative cutting surface and to be sheared at one side and rolled over to the inside of the cut as shown in FIG. 7 when an insert 32 is utilized. The insert 32 which is actually the abutting and cooperative surface of the journal structure 26 lends stability to the cutting device for it abuts against the upper surface of the sheet 34 and works against the lifting action provided by the 45 degree angulation of the cutting edges. Without such a cooperative cutting surface a bit of this type becomes unmanageable when rotated at conventional speed but with this cooperative cutting surface the entire device is very easily managed and accomplishes the cut in approximately ten percent of the time which would be otherwise required.

I have found that I can accomplish a satisfactory cut by using bits wherein the cutting edges extend within a range of 25 degrees–50 degrees off the vertical axis of the bit, particularly when I tilt the handle 11 and the bit 27 in such a way as to minimize the angulation of the cutting edges and make them more nearly approximately 45 degrees. If the angle is more than 45 degrees, then pressure is required to cause the bit to cut into the metal and becomes so great that the metal at the opening within which the pivot post is located tends to tear out and thereby introduce inaccuracies. To offset this the operator would then have to do the work alone alone by pressing the bit along the path of the cut.

The insert 32 is cut away along a part of its base in order to avoid cutting action between the base or cooperative cutting surface and the flute along a portion thereof while permitting another portion thereof to abut against the sheet and provide the required support for the sheet along with the cooperative cutting action. I have found that the insert of the type indicated by the numeral 50 is preferable for cutting heavier metals or for getting a smooth edge on both sides of the cut, while the insert 32 is preferable in cutting openings in metal of lighter gauges such as in plenum chambers and the like.

In the event it is desired to utilize this tool to cut along a straight line or a contour or a pattern the wing nut 24 may be loosened and the pivot post 19 swung or shifted toward the base portion 17 of the handle member 11 until it extends substantially horizontally and thus is in an out of way position. After so moving the pivot post the device may be used as a simple router, if desired, and the portion at the lower end of the insert which is not cut away may be utilized as a guide member.

When it is desired to utilize a different longitudinal portion of the bit 27 to perform the cutting action, this can be accomplished by merely turning the tubular member 26 relative to member 35 in the proper direction so that the external threaded portion on member 35 engaging threads on member 26 permits axial feeding by causing the annular shoulder 39 to elevate or lower relative to the member 35, as desired. When this is done a new cutting edge, or rather a different portion of the same cutting edge which has not been utilized previously, will commence to cooperate with the cooperative cutting surface of the insert because turning of the tubular member 26 will cause the bit member 27 to extend or recede relative to the insert and the cutting action will take place at a different point along the length of the bit. This adjustment feature is also important when it is desired to use the tool as a router for by manipulation of the tubular member 26 one can control the depth of cut to be made with the bit. It will be readily appreciated, of course, that the depth of cut is regulated by the distance from the lower end of the bit to the cooperative cutting surface 33 or 51 as the case may be.

From the above it can be seen that I have provided a novel and highly improved portable milling tool with which a circular opening can be cut into a sheet of sheet metal at a substantial saving of time, effort, and inconvenience. It will be noted that the device is extremely simple in construction and can be manufactured at low costs.

It will, of course, be understood that various changes may be made in the form, details, arrangement and proportions of the parts without departing from the scope of my invention which consists of the matter shown and described herein and set forth in the appended claims.

What is claimed is:

1. A portable sheet metal cutter comprising, a generally U-shaped handle member having a pair of vertically spaced leg elements, a pivot post movably mounted on one of said leg elements and being adapted to be inserted into a hole in a piece of sheet metal to function as a pivot for said handle member about the hole, and a rotary milling cutter member rotatably mounted in secured relation upon and extending at right angles thereto through each of said vertically spaced leg elements in the general plane thereof, said milling cutter member being adapted to be connected in driven relation to a source of rotary power.

2. The structure defined in claim 1, wherein said rotary milling cutter member is adjustably movable vertically and transversely relative to each of said leg elements.

3. A portable sheet metal cutter comprising, a generally U-shaped handle having a pair of vertically spaced leg members, a pivot post slidably mounted on the lower of said leg members for movement longitudinally thereof between fixed positions, a journal member mounted on the free end portions of said handle member, said journal member having lower portions having a lower cooperative abutting and cutting surface, and a rotary milling cutter member extending through the lower portions of said journal member and journalled therein and extending in close proximity to the lower surface thereof, said milling cutter member having cutting edges extending longitudinally upwardly a substantial distance above said lower surface of said journal member and cooperating therewith to cooperatively cut sheet metal therebetween, said rotary milling cutter member being adapted to be connected in driven relation to a source of rotary power.

4. A portable sheet metal cutter comprising, an elongated handle member, a pivot post mounted on said handle member and extending throughout its length generally normal to said handle member and extending therethrough and adapted to be inserted in an opening in a piece of sheet metal to provide a pivot for said handle member around the opening, and a rotary milling cutter member carried by and rotatably mounted on said handle member in secured relation thereto and extending therethrough in spaced relation to said pivot post and extending generally normal to said handle member and parallel to the axis of pivot thereof, said rotary milling cutter member being adapted to be connected in driven relation to a source of rotary power, said handle member being curved and said pivot post being adjustably shiftable longitudinally of said handle member from a vertically extending pivot post to a substantially horizontal out-of-way position.

5. A portable sheet cutter for cutting a section of the sheet completely therefrom by relative movement between the cutter and the sheet, said cutter comprising:
 (a) a milling cutter member adapted to be connected in driven relation to a source of rotary power,
 (b) a journal structure rotatably supporting said milling cutter member for rotation of the latter about its longitudinal axis,
 (c) said milling cutter member having a portion thereof extending along its longitudinal axis outwardly from said journal structure and having helical cutting edges extending along said outwardly extending portion, and
 (d) a cooperative cutter element carried by said journal structure and having a cooperative cutting surface fixed relative to and disposed immediately adjacent to and intermediate the ends of said cutting edges and effecting therewith a positive cooperative cutting action in a single plane upon a sheet of sheet metal when the rotating cutting edges of said milling cutter are applied to such sheet metal.

6. A portable sheet cutter for cutting a section of the sheet completely therefrom by relative movement between the cutter and the sheet, said cutter comprising:
 (a) a milling cutter member adapted to be connected in driven relation to a source of rotary power,
 (b) a journal structure rotatably supporting said milling cutter member for rotation of the latter about its longitudinal axis,
 (c) said milling cutter member having a portion thereof extending along its longitudinal axis outwardly from said journal structure and having helical cutting edges extending along said outwardly extending portion,
 (d) a cooperative cutter element carried by said journal structure and having a cooperative cutting surface fixed relative to and disposed immediately adjacent to and intermediate the ends of said cutting edges and effecting therewith a positive cooperative cutting action in a single plane upon a sheet of sheet metal when the rotating cutting edges of said milling cutter are applied to such sheet metal, and
 (e) said outer cooperative cutting surface extending only a portion of the distance around said milling cutter member and being relieved the remainder of the distance around said milling cutter member to create a tearing action on the metal thereat.

7. A portable sheet cutter for cutting a section of the sheet completely therefrom by relative movement between the cutter and the sheet, said cutter comprising:
 (a) a milling cutter member adapted to be connected in driven relation to a source of rotary power,
 (b) a journal structure rotatably supporting said milling cutter member for rotation of the latter about its longitudinal axis,
 (c) said milling cutter member having a portion thereof extending along its longitudinal axis outwardly from said journal structure and having helical cutting edges extending along said outwardly extending portion,
 (d) a cooperative cutter element carried by said journal structure and having a cooperative cutting surface fixed relative to and disposed immediately adjacent to and intermediate the ends of said cutting edges and effecting therewith a positive cooperative cutting action in a single plane upon a sheet of sheet metal when the rotating cutting edges of said milling cutter are applied to such sheet metal, and
 (e) said cooperative cutting surface extending continuously around said milling cutter member.

8. A portable sheet cutter for cutting a section of the sheet completely therefrom by relative movement between the cutter and the sheet, said cutter comprising:
 (a) a milling cutter member adapted to be connected in driven relation to a source of rotary power,
 (b) a journal structure rotatably supoprting said milling cutter member for rotation of the latter about its longitudinal axis,
 (c) said milling cutter member having a portion thereof extending along its longitudinal axis outwardly from said journal structure and having helical cutting edges extending along said outwardly extending portion,
 (d) a cooperative cutter element carried by said journal structure and having a cooperative cutting surface fixed relative to and disposed immediately adjacent to and intermediate the ends of said cutting edges and effecting therewith a positive cooperative cutting action in a single plane upon a sheet of sheet metal when the rotating cutting edges of said milling cutter are applied to such sheet metal, and
 (e) said journal structure having wall structure defining a hollow interior adjacent the said cutting edges of said milling cutter member and having an opening in said wall structure above said cooperative cutting surface and adjacent said cutting edges of said milling cutter member to permit metal filings carried by said milling cutter member into said journal to be discharged therethrough.

9. A portable sheet cutter for cutting a section of the sheet completely therefrom by relative movement between the cutter and the sheet, said cutter comprising:
 (a) a milling cutter member adapted to be connected in driven relation to a source of rotary power,
 (b) a journal structure rotatably supporting said milling cutter member for rotation of the latter about its longitudinal axis,
 (c) said milling cutter member having a portion thereof extending along its longitudinal axis outwardly from said journal structure and having helical cutting edges extending along said outwardly extending portion,
 (d) a cooperative cutter elemnet carried by said journal structure and having a cooperative cutting surface fixed relative to and disposed immediately adjacent to and intermediate the ends of said cutting edges and effecting therewith a positive cooperative cutting action in a single plane upon a sheet of sheet metal when the rotating cutting edges of said milling cutter are applied to such sheet metal, and (e) a stabilizer carried by said journal structure adjacent said cooperative cutting surface of said milling cutter member and extending radially outwardly therefrom and outwardly from said journal structure in a plane parallel to the longitudinal axis of said milling cutter member and in the same horizontal plane as said cutting edges of said milling cutter member.

10. A portable sheet cutter for cutting a section of the sheet completely therefrom by relative movement between the cutter and the sheet, said cutter comprising:
   (a) a milling cutter member adapted to be connected in driven relation to a source of rotary power,
   (b) a journal structure rotatably supporting said milling cutter member for rotation of the latter about its longitudinal axis,
   (c) said milling cutter member having a portion thereof extending along its longitudinal axis outwardly from said journal structure and having helical cutting edges extending along said outwardly extending portion,
   (d) a cooperative cutter element carried by said journal structure and having a cooperative cutting surface fixed relative to and disposed immediately adjacent to and intermediate the ends of said cutting edges and effecting therewith a positive cooperative cutting action in a single plane upon a sheet of sheet metal when the rotating cutting edges of said milling cutter are applied to such sheet metal,
   (e) said milling cutter member being adjustably shiftable longitudinally relative to said journal structure, and
   (f) means for adjustably shifting said milling cutter member longitudinally relative to said journal structure and said cooperative cutter element whereby different portions of said cutting edges along the length of said milling cutter member may be utilized as desired to accomplish the cooperative cutting action.

11. A portable sheet cutter for cutting a section of the sheet completely therefrom by relative movement between the cutter and the sheet, said cutter comprising:
   (a) a milling cutter member adapted to be connected in driven relation to a source of rotary power,
   (b) a journal structure rotatably supporting said milling cutter member for rotation of the latter about its longitudinal axis,
   (c) said milling cutter member having a portion thereof extending along its longitudinal axis outwardly from said journal structure and having helical cutting edges extending along said outwardly extending portion,
   (d) a cooperative cutter element carried by said journal structure and having a cooperative cutting surface fixed relative to and disposed immediately adjacent to and intermediate the ends of said cutting edges and effecting therewith a positive cooperative cutting action in a single plane upon a sheet of sheet metal when the rotating cutting edges of said milling cutter are applied to such sheet metal, and
   (e) said cutting edges of said milling cutter member extending at an angle approximately forty-five degrees relative to the longitudinal axis of said milling cutter member.

12. A portable sheet cutter for cutting a section of the sheet completely therefrom by relative movement between the cutter and the sheet, said cutter comprising:
   (a) a milling cutter member adapted to be connected in driven relation to a source of rotary power,
   (b) a journal structure rotatably supporting said milling cutter member for rotation of the latter about its longitudinal axis,
   (c) said milling cutter member having a portion thereof extending along its longitudinal axis outwardly from said journal structure and having helical cutting edges extending along said outwardly extending portion,
   (d) a cooperative cutter element carried by said journal structure and having a cooperative cutting surface fixed relative to and disposed immediately adjacent to and intermediate the ends of said cutting edges and effecting therewith a positive cooperative cutting action in a single plane upon a sheet of sheet metal when the rotating cutting edges of said milling cutter are applied to such sheet metal,
   (e) said cooperative cutting surface extending only a portion of the distance around said milling cutter member and being relieved the remainder of the distance around said milling cutter member to create a tearing action on the metal thereat, and
   (f) said journal structure having an opening formed therein above said cooperative cutting surface to permit ready egress of chips of metal therefrom.

References Cited in the file of this patent

UNITED STATES PATENTS

| | | |
|---|---|---|
| 965,337 | Shek | July 26, 1910 |
| 1,446,342 | Gerdil | Feb. 20, 1923 |
| 1,771,764 | Beattie | July 29, 1930 |
| 1,940,220 | McGrath | Dec. 19, 1933 |
| 1,963,611 | Brummel et al. | June 19, 1934 |
| 1,964,030 | Brush | June 26, 1934 |
| 2,238,304 | Belanger | Apr. 15, 1941 |
| 2,238,578 | Burkeman | Apr. 15, 1941 |
| 2,301,151 | Spievak | Nov. 3, 1942 |
| 2,309,777 | Kowalske | Feb. 2, 1943 |
| 2,578,371 | Plester | Dec. 11, 1951 |
| 2,693,134 | Mole | Nov. 2, 1954 |
| 2,714,408 | Pedersen | Aug. 2, 1955 |
| 2,797,598 | Labenz | July 2, 1957 |
| 3,073,023 | Koeppen | Jan. 15, 1963 |

FOREIGN PATENTS

| | | |
|---|---|---|
| 4,883 | Great Britain | 1886 |